United States Patent [19]

Hintermeier et al.

[11] 3,919,319

[45] Nov. 11, 1975

[54] QUATERNARY AMMONIUM CHLORIDES

[75] Inventors: Karl Hintermeier; Otto Trosken, both of Frankfurt am Main; Siegfried Wirth, Nieder-Rosbach, all of Germany

[73] Assignee: Cassella Farbewerke Mainkur Aktiengesellschaft, Germany

[22] Filed: Sept. 24, 1973

[21] Appl. No.: 399,699

[30] Foreign Application Priority Data
Oct. 13, 1972 Germany............................ 2250133

[52] U.S. Cl................................. 260/567.6 M; 8/84
[51] Int. Cl.².......................................... C07C 93/06
[58] Field of Search................. 260/567.6, 567.6 M

[56] References Cited
UNITED STATES PATENTS

| | | | |
|---|---|---|---|
| 2,581,336 | 1/1952 | Hartman et al................. | 260/567.6 |
| 2,775,604 | 12/1956 | Zech............................... | 260/567.6 |
| 3,326,927 | 6/1967 | Aamoth.......................... | 260/567.6 |

FOREIGN PATENTS OR APPLICATIONS

| | | | |
|---|---|---|---|
| 1,561,630 | 3/1969 | France............................ | 260/567.6 |
| 1,084,134 | 9/1967 | United Kingdom............. | 260/567.6 |

*Primary Examiner*—Bernard Helfin
*Assistant Examiner*—James H. Reamer
*Attorney, Agent, or Firm*—Connolly and Hutz

[57] ABSTRACT

A quaternary ammonium chloride of the formula

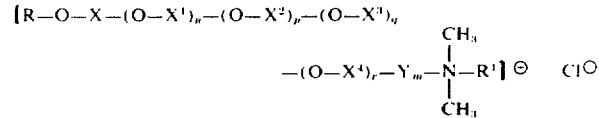

wherein R is alkyl or alkenyl having from 1 to 6 carbon atoms or phenyl, $R^1$ is alkyl or alkenyl having 10 to 22 carbon atoms, X, $X^1$, $X^2$, $X^3$ and $X^4$ are $-CH_2-CH_2-$,

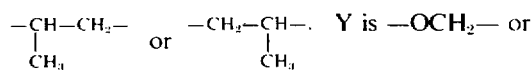

Y is $-OCH_2-$ or

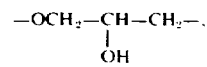

$n$, $p$, $q$, $r$ and $m$ are each zero or one and $n + p + q + r = a-m$ wherein $a$ is 1, 2, 3 or 4 and the utility thereof as an equalizing aid in dyeing acrylonitrile-containing polymers.

5 Claims, No Drawings

QUATERNARY AMMONIUM CHLORIDES

This invention relates to quaternary ammonium chlorides of the formula

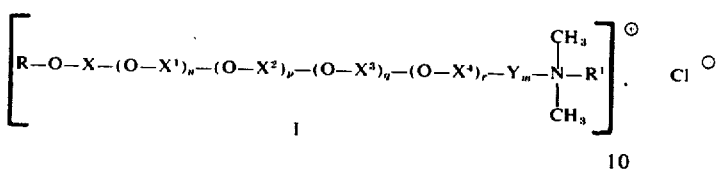

wherein R is alkyl or alkenyl having from 1 to 6 carbon atoms or phenyl, $R^1$ is alkyl or alkenyl having 10 to 22 carbon atoms, X, $X^1$, $X^2$, $X^3$ and $X^4$ are -$CH_2$-$CH_2$-,

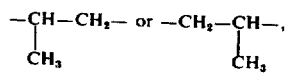

Y is -$OCH_2$- or

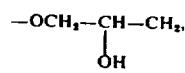

$n$, $p$, $q$, $r$ and $m$ are each zero or one and $n + p + q + r = a-m$ wherein $a$ is 1, 2, 3 or 4.

Additionally, the present invention relates to use of the aforesaid quaternary ammonium chlorides as equalizing aids in the dyeing of acrylonitrile-containing polymers.

The preferred R moieties for the quarternary ammonium chlorides of this invention are alkyl having 1 to 4 carbon atoms and phenyl. The preferred $R^1$ moieties are alkyl having 12 to 18 carbon atoms. It will be apparent that X, $X^1$, $X^2$, $X^3$ and $X^4$ may be the same or different.

Compounds of formula I may be prepared by reacting a chloride of formula II with a tertiary amine of formula III in accordance with the following reaction equation:

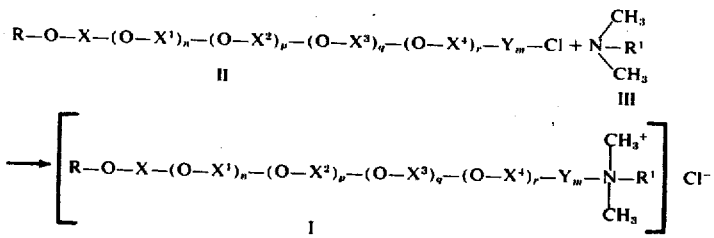

The reaction rate depends upon the reactivity of the chloride of formula II. For those wherein Y is -$OCH_2$- and which therefore contain the chloromethyl group -$OCH_2Cl$, the reaction rate is very high and a multistage agitation with the tertiary amine of formula III is sufficient at room temperature or slightly elevated temperatures up to about 50°C. Additionally, an inert solvent may be used in order to dissipate the heat of reaction. Suitable inert solvents include, for example, ethers, ketones and hydrocarbons such as diethylether, acetone, methylethylketone and benzene. Especially preferred are the chlorohydrocarbons such as methylene chloride, trichloroethylene, perchloroethylene and carbon tetrachloride. The remaining chlorides of formula II must, as a rule, be heated several hours at 80°–150°C. with the tertiary amines of formula III in order to carry out the aforesaid reaction. Generally, reactants II and III are heated to 100°–130°C. for 10-20 hours. The reaction is terminated when the reaction product becomes soluble in water. Reactants II and III are generally used in stoichiometric quantities. One of these may also be employed in a slight molar excess, i.e., up to about 0.3 mols excess. A larger excess of one of the reactants effects a faster reaction but the unused excess, because of its poor water solubility and reasons of economy, must be separated in an additional step from the reaction product, for example by agitating with ether or distilling at a reduced pressure.

The starting compounds of formula II wherein m is zero are either known compounds or may be readily prepared in accordance with known methods. Where m is zero and $n$, $p$, $q$ and $r$ are each one, an alcohol of formula IV is reacted with an epoxide of formula V in accordance with the equation:

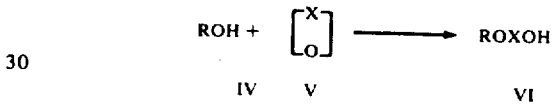

and the process is repeated in accordance with the following equations:

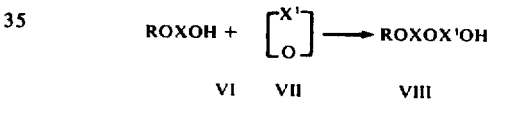

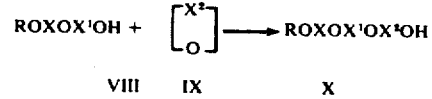

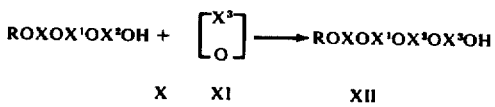

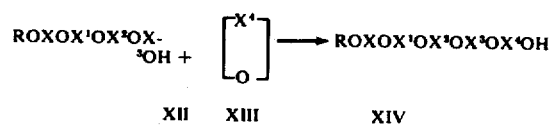

When employing ethylene oxide as the epoxides of formulas V, VII, IX, XI and XIII, the reactions proceed at temperatures of the order of 220°–250°C. without the necessity of a catalyst. However, these reactions may be accelerated by the use of acid or basic catalysts.

Typical acid catalysts include sulfuric acid, stannic tetrachloride, borine trifluoride and anhydrous hydrofluoric acid. Typical basic catalysts include sodium hydroxide, sodium alkylate and tributylamines. The reaction of the alcohol of formulas IV, VI, VIII or XII with the epoxide of formula V, VII, IX, XI or XIII is normally terminated by neutralizing, filtering and distillation.

If propylene oxide is employed as the epoxide of formulas V, VII, IX, XI and XIII of the aforesaid reactions of alcohols with epoxides, suitable selection of catalysts influences the introduction of

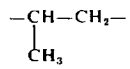

or

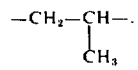

Acid catalysts yield primary alcohols as intermediate products VI, VIII, X, XII and XIV and therefore introduce the group

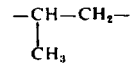

for X, X$^1$, X$^2$, X$^3$ and X$^4$. Basic catalysts yield secondary alcohols as the aforesaid intermediate products and therefore introduce the group

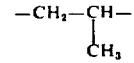

for X, X$^1$, X$^2$, X$^3$ and X$^4$.

The reaction conditions for reacting alcohols with epoxides are well known and are described, for example, in such comprehensive works as Houben-Weyl, Methoden der organischen Chemie [Methods of Organic Chemistry], Vol. VI/3, pp. 40–44, Georg Thieme Publishers, Stuttgart, 1965; Elderfield, Heterocyclic Compounds, Vol. 1, pp. 22–46, John Wiley & Sons, Inc., New York, 1950 and Chemical Reviews, 59, pp. 737–799 (1959).

Intermediate products VI, VIII, X, XII and XIV may be converted into the starting product of formula II when m is equal to zero by known processes for converting an alcoholic OH group to halogen. One particularly simple way of doing this is to react the intermediate product with thionyl chloride.

Reactants of formula II wherein m is equal to one and Y is -OCH$_2$- are obtained by chloromethylating intermediate products VI, VIII, X, XII or XIV in known manner with formaldehyde and hydrochloric acid. In lieu of formaldehyde, paraformaldehyde or trioxane (trioxymethylene) may be used. For chloromethylation with paraformaldehyde or trioxane, the initial reactants are dissolved in a suitable solvent such as benzene and dry hydrogen chloride is introduced into the solution to the point of saturation. Normally, cooling to 5° to 10°C. is employed in that step. Then, the aqueous layer formed is removed and the organic layer is dried and distilled.

For the preparation of the reactants of formula II wherein m is equal to one and Y is

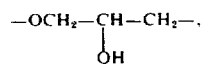

intermediate products VI, VIII, X, XII and XIV are reacted with epichlorhydrin in the presence of an acid catalyst. See Houben-Weyl, ibid., p. 40.

The reactants of formulas III and IV are, of course, well known to those skilled in the art and readily available through known preparation processes.

Typical tertiary amines of formula III include dimethyldecylamine, dimethyldodecylamine, technical grade dimethyllaurylamine, dimethylhexadecylamine, dimethylstearylamine, dimethyloleylamine, dimethyl tallow amine, dimethyleicosylamine and dimethyldocosylamine. Suitable alcohols of formula IV include, for example, methanol, ethanol, n-propanol, n-butanol, isobutanol, secondary butanol, n-amyl alcohol, isoamyl alcohol, tertiary amyl alcohol, n-hexanol, allyl alcohol, crotyl alcohol and phenol.

The novel compounds of this invention usually are hygroscopic, poorly crystallizing salts which normally precipitate as viscous or glassy solified melts which are readily soluble in water.

The compounds of formula I are especially effective as equalizing aids with basic dyestuffs when dyeing fibers or textiles of any sort based on a homopolymer or copolymer of acrylonitrile. By basic dyestuffs is meant, for example, dyestuffs of the diarylmethane and triarylmethane series, the indolylarylmethane and diindolylarylmethane, oxazine, thiazine, diazine, induline and cyanine dyestuffs, as well as the basic azo and azomethine dyestuffs.

A mixture of two or more compounds of formula I may be employed as equalizing aids. Either a compound or a mixture of compounds of that formula is added to the dye bath in a quantity of 0.1 to 5% by weight, based on the weight of the material to be dyed. For equalizing unequal dyeings, somewhat larger quantities are generally required. The dye goods, in this connection, are treated in a bath which contains one or more compounds of formula I in an amount up to 10% by weight, based on the weight of the dye goods.

Acid modified fiber materials of polyacrylonitrile are known to be readily dyed to saturated and deep color hues with basic dyestuffs. Unfortunately, the cation-active dyestuffs are received so quickly that an uneven dyeing is often obtained if no equalizing aid is used. In order to assure a uniform coloration for polyacrylonitrile fibers, the use of specially developed equalizing aids, i.e., so-called retarders, is required. For the dyeing of polyacrylonitrile structures, for example, German Published application No. 1,123,286 teaches the use of a quaternary alkoxyalkylammonium compound as the retarder, said compound having at least one hydrocarbon radical containing more than 8 carbon atoms. However, such retarders with long, hydrophobic hydrocarbon radicals have the disadvantage that in the event of an accidental overdosing, they tenaciously reserve the polyacrylonitrile fiber to be dyed and thereby make it practically impossible to achieve the desired color depth or shade. The unused dyestuff remaining in the bath is also lost. Retarding agents with such properties are referred to as permanent retarders.

It is already known (German Pat. No. 1,148,971) that relatively low molecular weight quarternary ammonium chloride compounds such as N-benzylpyridinium chloride are well adapted as temporary retarders. They permit equal dyeings without reserving the fibers and practically without any loss of basic dyestuff in the dye bath. Moreover, they even have a defined migration promoting effect. However, they are usually relatively weak.

It has now been found that quarternary ammonium compounds with a long alkyl radical also possess the properties of temporary retarders if they contain, as do the novel compounds of formula I, a terminally etherified polyalkylene glycol chain. These compounds are considerably more efficient than the relatively low-molecular weight quarternary ammonium compounds and achieve practically the same efficiency as the quaternary alkoxyalkylammonium compounds with long hydrophobic hydrocarbon radicals. In comparison to the latter compounds, the compounds of formula I show a much lower dyestuff retarding effect, i.e., a much lower performance, when used as retarders. The permanence decreases with an increasing number of ether groups in the molecule.

The following examples are for the purpose of illustration, all temperatures being in degrees Centigrade.

EXAMPLE 1

Dimethylhexadecylamine (54 g - 0.2 mol) and 40 g of the compound of the formula $CH_3$-O-$CH_2$-$CH_2$-O-$CH_2$-$CH_2$-O-$CH_2$-$CH_2$-Cl (0.22 mol of colorless oil having a boiling point of 111°-113°/13 mm, prepared from methyltriglycol and thionyl chloride with pyridine as the catalyst) are agitated for 10 hours at 120°-125° with the exclusion of moisture. The brownish melt was then clearly water-soluble with a practically neutral reaction. Upon cooling, it solidified to a firm, yellow-brown wax. The product has the formula $$\left[C_{16}H_{33}-\overset{\overset{CH_3}{|}}{\underset{\underset{CH_3}{|}}{N}}-(CH_2-CH_2-O)_3-CH_3\right]^{\oplus} Cl^{\ominus}$$

By dissolving in 188 ml warm water, 282 g of a clear, red-brown 33 percent solution were obtained.

In the above procedure, the dimethylhexadecylamine was substituted by other tertiary amines. With 42.5 g dimethyldodecylamine (0.2 mol), there was obtained the compound

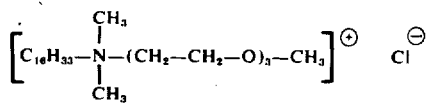

and with 59.4 g dimethylstearylamine (0.2 mol), there was obtained the compound

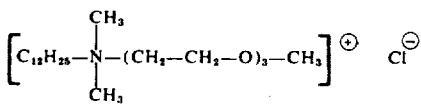

EXAMPLE 2

Dimethylstearylamine (59.4 g - 0.2 mol) and 31 g $C_2H_5$-(O-$CH_2$-$CH_2$)$_2$-Cl (about 0.2 mol of a colorless oil having a boiling point of 65°/10 mm prepared from ethyldiglycol and thionylchloride with pyridine as catalyst) were heated 16 hours during agitating to 120°-125° until the melt became clearly water soluble. It was then thinned by the addition with stirring of 270 ml water to a total weight of 360 g, corresponding to a 25 percent content of effective retarder. The product has the formula

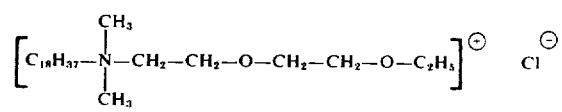

Prepared analogously were: with 27.5 g $CH_3(OCH_2CH_2)_2Cl$ (0.2 mol of a colorless oil having a boiling point of 78°/30 mm), the compound

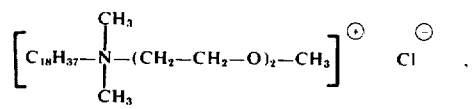

with 33.5 g $(C_3H_7(OCH_2CH_2)_2Cl$ (0.2 mol of a colorless oil having a boiling point of 76°/10 mm), the compound

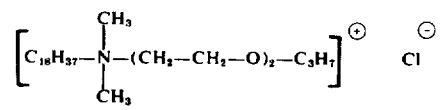

and with 40 g $C_6H_5(OCH_2CH_2)_2Cl$ (0.2 mol of a colorless oil having a boiling point 112°/0.2 mm), the compound

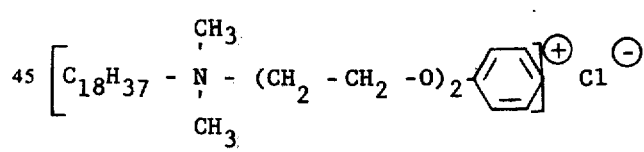

EXAMPLE 3

Dimethyl coconut oil alkylamine (80 g - 0.33 mol) and 85 g $C_3H_7$-O-$CH_2$-O-$CH_2$-$CH_2$-O-$CH_2$-$CH_2$-O-$CH_2$-$CH_2$-Cl (0.33 mol of a colorless oil having a boiling point of 114°-117°/0.15 mm, prepared from n-propyltetraglycol and excess thionylchloride with pyridine as catalyst at 60°-65°) were heated during stirring for 15 hours to 120°-125° until an assay was clearly water-soluble. By dissolving the entire quantity in 525 ml warm water obtained were 700 g of a clear, reddish-brown 25 percent aqueous solution. The compound has the formula

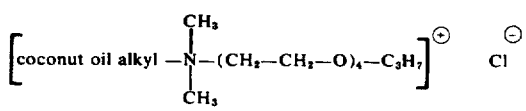

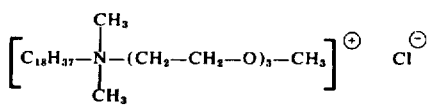

Analogously prepared were: with 56 g C₃H₇-(O-CH₂-CH₂)₂-Cl (0.33 mol of a colorless oil having a boiling point of 76°/10 mm), the compound

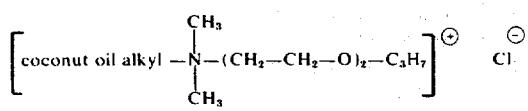

and with 70.5 g C₃H₇-(O-CH₂-CH₂)₃-Cl (0.33 mol of a colorless oil having a boiling point of 122°/10 mm), the compound

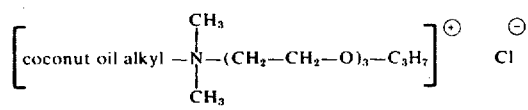

EXAMPLE 4

Dimethyltetradecylamine (60 g - 0.25 mol) and 80 g of a crude, statistic mixture of the cross-sectional formula C₄H₉-(O-CH₂-CH₂)₅-Cl (about 0.25 mol prepared by statistic accumulation of 4 mol ethylene oxide to one mol n-butoxyethanol and reaction of the crude adduct with excess thionylchloride) were heated to 120°-125° with stirring for 10 hours. Upon cooling, obtained are 140 g of a highly viscous, brown reaction product of the formula

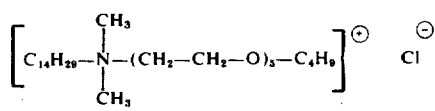

which easily dissolves clear in warm water. For the use as a retarder, a 50 percent aqueous solution was prepared because of better handling. The numerical indication "5" in the above formula is an average value.

Actually, the product is a mixtue of compounds with 2, 3, 4, 5 and 6-CH₂-CH₂-O- groups in the molecule. Analogously prepared were: with 74 g dimethyloctadecylamine (0.25 mol), the compound

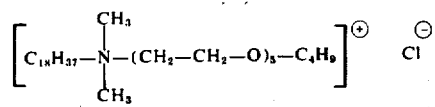

and with 58 g of a crude, statistic mixture of the average formula CH₃-(O-CH₂-CH₂)₄Cl (about 0.25 mol prepared by statistic accumulation of 3 mol ethylene oxide on one mol methylglycol and reaction of the crude adduct with excess thionylchloride), the compound

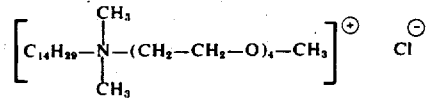

EXAMPLE 5

Dimethylhexadecylamine (67 g - 0.25 mol) was dissolved in 100 ml methylethylketone and in the course of one half hour there was added at room temperature a solution consisting of 44 g 1-butoxy-2-chloromethoxyethane (about 0.25 mol prepared by the reaction of butylglycol with paraformaldehyde and hydrogen chloride in a benzene solution at room temperature and of a high yield and purity) in 50 ml methylethylketone. Then heating proceeded at 35°–40°C. for 20 hours and thereafter the solvent was distilled off under water jet vacuum without residue at a temperature below 50°. Obtained were 111 g of a highly viscous, amber-colored, water-soluble residue having the formula

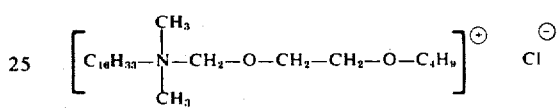

A 25 percent solution was prepared for use as a retarder. Analogously prepared were:

with 40 g 1-propoxy-2-chloromethoxyethane (about 0.25 mol of colorless crude oil, prepared in a good yield like the butoxy compound), the compound

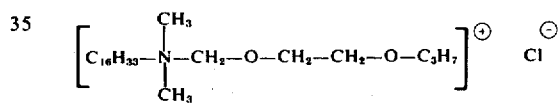

with 48 g 1-phenoxy-2-chloromethoxyethane, the compound

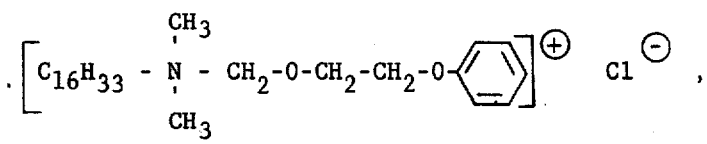

with 45 g 1-methoxyethoxy-2-chloromethoxyethane (about 0.25 mol prepareed as a colorless crude oil of methyldiglycol and paraformaldehyde/HCl in dry benzene at room temperature), the compound

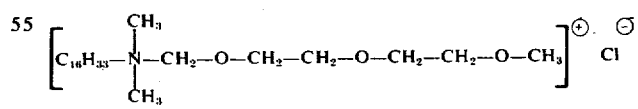

and with 64 g 1-phenoxyethoxy-2-chloromethylpropane (prepared from phenoxyethanol, propylene oxide and paraformaldehyde/HCl in dry benzene as solvent), the compound

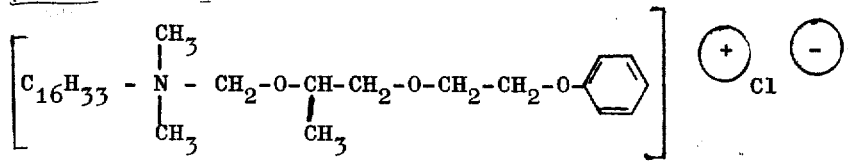

EXAMPLE 6

Dimethyldodecylamine (53.5 g – 0.25 mol) and 54 g 1-phenoxy-2-(β-chloroethoxy)-propane (about 0.25 mol of colorloss oil having a boiling point of 110°–112°/0.4 mm, prepared by the oxyethylation of phenoxyisopropanol and the reaction of the adduct isolated by fractionated distillation with excess thionylchloride and pyridine as catalyst) were heated to 120°–125° for 15 hours with stirring and moisture exclusion until the melt was water-soluble, whereby a practically quantitative reaction was indicated. The compound had the formula

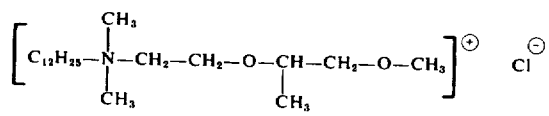

A 50 percent aqueous solution was prepared for use as a retarder.

Analogously obtained, by the use of the corresponding quantity of 1-methoxy-2-(β-chloroethoxy)-propane in place of the chloride in the above procedure, was

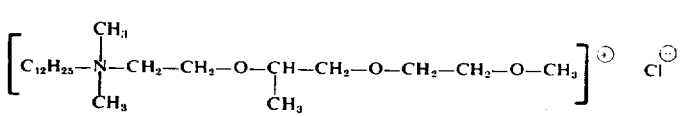

Analogously and by the use of 1-methoxyethoxy-2-(β-chloroethoxy)-propane, there was obtained

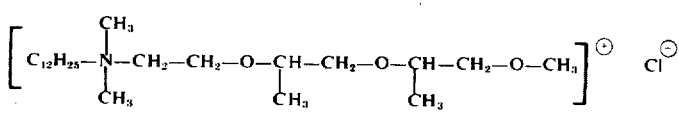

Analogously and by the use of 1-methoxy-iisopropoxy-2-(β-chloroethoxy)-propane, there was obtained

[C$_{12}$H$_{25}$—N(CH$_3$)(CH$_3$)—CH$_2$—CH$_2$—O—CH(CH$_3$)—CH$_2$—O—CH(CH$_3$)—CH$_2$—O—CH$_3$]$^{\oplus}$ Cl$^{\ominus}$

EXAMPLE 7

Dimethylstearylamine (59 g - 0.2 mol) and 41 g C$_3$H$_7$-O-CH$_2$-CH$_2$-O-CH$_2$-CHOH-CH$_2$Cl (about 0.2 mol of a colorless oil having a boiling point of 70°/0.4 mm, prepared from n-propylglycol and epichlorhydrin with 1% boron fluoride etherate as catalyst) were heated 10 hours with stirring to 120°, whereupon the melt was clearly water-soluble. Then it was cooled to 80° and then thinned with 100 g water to obtain 200 g of a 50% aqueous solution of the compound

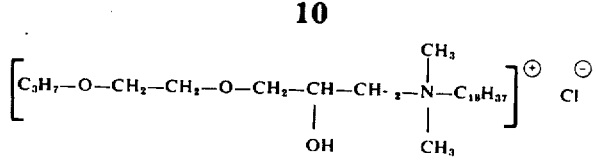

Analogously prepared with 43 g CH$_3$-O-(CH$_2$-CH$_2$-O)$_2$-CH$_2$-CHOH-CH$_2$-Cl (colorless oil having a boiling point of 95°10.2 mm, prepared from methyldiglycol and epichlorhydrin), was the compound

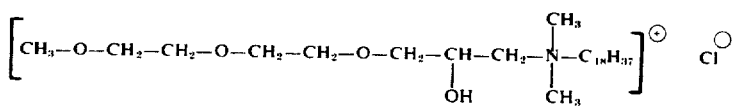

EXAMPLE 8

Polyacrylonitrile yarn (10 g) was introduced, in -methoxy-isopropoxy-laboratory dyeing apparatus at a liquor ratio of 1:40, into a 98° bath containing per liter, 0.075 g of the commercial dyestuff

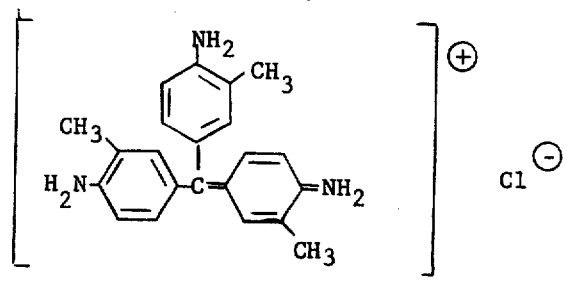

0.225 ml glacial acetic acid and 0.3 g of a 35 percent aqueous solution of the first product of Example 1. Dyeing proceeded 90 minutes at 98°. There was obtained a perfect, equal red-violet dyeing. The other componds of Examples 1 through 7 obtain similar results. If dyeing is carried out under otherwise equal conditions, but without the addition of a compound of this invention, there is obtained a useless, spotty coloration.

EXAMPLE 9

If the procedure is as described in Example 8 but in place of the dyestuff used there, 0.2 g of the commercial dyestuff

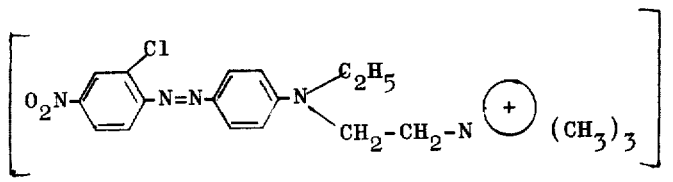

is used and in place of the first product of Example 1, 0.4 g of a 25 percent aqueous solution of the first product of Example 2 is used, there is obtained a perfect even red coloration.

If a coloration is prepared under otherwise equal conditions but with double the amount of the first product of Example 2, only a slight dyestuff amount is retained in the dye bath. If a coloration is prepared under otherwise equal conditions but with a permanent retarder free of polyether groups, the retarder being present in the dye bath with the double of its normal concentration, a considerable dyestuff amount is retained in the dye bath.

Similar results are obtained if the second through the fourth products of Example 2 are used. A coloration, which is carried out without the addition of a novel compound of this invention but otherwise under the same conditions, is a useless spotty coloration.

EXAMPLE 10

If the procedure is as described in Example 8 but under otherwise equal conditions there are added 0.2 g of the commercial dyestuff

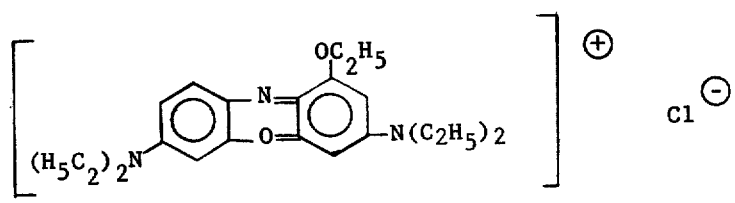

and 0.4 g of a 25 percent aqueous solution of the compound according to the first product of Example 3, then there is obtained a perfect, even blue coloration. Using the second and third products of Example 3, the same good results are obtained. Without the use of the aforesaid products, useless, spotty colorations are obtained.

EXAMPLE 11

Equally good colorations are obtained if under otherwise equal conditions, there are used 0.075 g of a commercial dyestuff

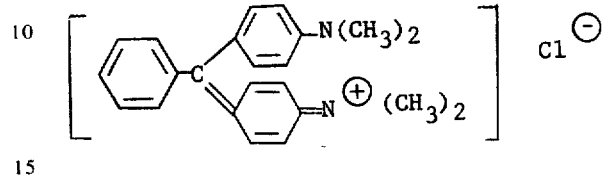

and 0.2 g of a 50 percent aqueous solution of the first compound of Example 4. A perfect, even, green coloration results. Equally good results are obtained if the second and third compounds of that Example are used. Without addition of the described compounds, there are obtained useless, spotty colorations.

EXAMPLE 12

If the procedure is as described in Example 8, but in place of the first compound of that Example, 0.4 g of the first compound of Example 5 is used, a perfect even red-violet coloration is also obtained. If the remaining compounds of Example 5 are used, there is obtained equally good results and such results are not obtained in the absence of a compound of this invention.

EXAMPLE 13

If the procedure is as described in Example 8, but in place of the dyestuff used there, 0.2 g of the commercial dyestuff

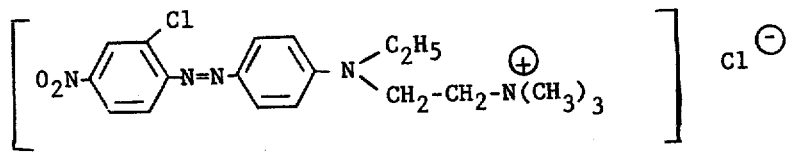

is employed and in the place of the first compound of that Example, 0.2 g of the first compound of Example 6, there is obtained a perfect, even red coloration. The remaining compounds of Example 6 act similarly. Dyeings under otherwise equal conditions but without the use of the novel compounds of this invention produce useless, uneven colorations.

What is claimed is:

1. A quaternary ammonium chloride of the formula

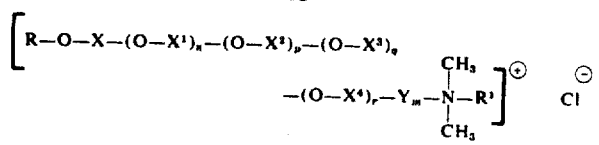

wherein R is alkyl having from 1 to 6 carbon atoms, R¹ is alkyl or alkenyl having 10 to 22 carbon atoms, X, X¹, X², X³ and X⁴ are -CH-CH₂-,

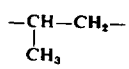

or

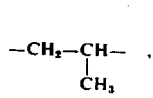

Y is

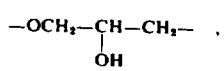

$n, p, q, r$ and $m$ are each zero or one and $n + p + q + r = a-m$ wherein $a$ is 1, 2, 3 or 4.

2. The quarternary ammonium chloride of claim 1 wherein R is alkyl having 1 to 4 carbon atoms.

3. The quarternary ammonium chloride of claim 1 wherein R¹ is alkyl having 12 to 18 carbon atoms.

4. The quarternary ammonium chloride of claim 1 wherein R is alkyl having 1 to 4 carbon atoms and R¹ is alkyl having 12 to 18 carbon atoms.

5. The quaternary ammonium chloride of claim 1 having the formula

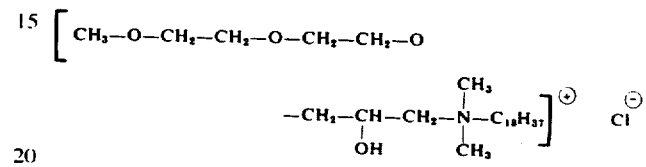

* * * * *